US011432282B2

(12) United States Patent
Cao et al.

(10) Patent No.: US 11,432,282 B2
(45) Date of Patent: Aug. 30, 2022

(54) SYSTEM AND METHOD FOR SCHEDULING COMMUNICATION RESOURCES

(71) Applicant: ZTE CORPORATION, Guangdong (CN)

(72) Inventors: Wei Cao, Guangdong (CN); Li Tian, Guangdong (CN); Tao Lu, Guangdong (CN); Wuchen Jiao, Guangdong (CN); Jinbang Zong, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 310 days.

(21) Appl. No.: 16/776,414

(22) Filed: Jan. 29, 2020

(65) Prior Publication Data
US 2020/0170011 A1 May 28, 2020

Related U.S. Application Data

(63) Continuation of application No. PCT/CN2017/095963, filed on Aug. 4, 2017.

(51) Int. Cl.
*H04W 72/04* (2009.01)
*H04W 72/00* (2009.01)
*H04W 74/08* (2009.01)

(52) U.S. Cl.
CPC ..... *H04W 72/0446* (2013.01); *H04W 72/005* (2013.01); *H04W 72/042* (2013.01); *H04W 74/0808* (2013.01)

(58) Field of Classification Search
CPC ........... H04W 72/0446; H04W 72/005; H04W 72/042; H04W 74/0808; H04W 74/006;
(Continued)

(56) References Cited

U.S. PATENT DOCUMENTS 5,594,738 A 1/1997 Crisler et al.
2003/0086373 A1 5/2003 Kronz
(Continued)

FOREIGN PATENT DOCUMENTS

CN 101137196 A 3/2008
CN 103813458 A 5/2014
(Continued)

OTHER PUBLICATIONS

Baloch, et al., "A New Medium Access Protocol for RFID Networks with Foresight", 2011, IEEE (Year: 2011).*
(Continued)

*Primary Examiner* — Michael K Phillips
(74) *Attorney, Agent, or Firm* — Duane Morris LLP

(57) ABSTRACT

A system and method for allocating network resources are disclosed herein. In one embodiment, the system and method are configured to perform: determining a plurality of time slot resources contiguously allocated along a time domain, wherein a first subset of the plurality of time slot resources is assigned for receiving a first signal and a second subset of the plurality of time slot resources, contiguously allocated after the first subset of the plurality of time slot resources along the time domain, is assigned for receiving a second signal; and receiving the second signal transmitted in part of the first subset of the plurality of time slot resources.

17 Claims, 4 Drawing Sheets

(58) Field of Classification Search
CPC .. H04W 74/0841; H04W 72/04; H04W 74/08
See application file for complete search history.

(56) References Cited

U.S. PATENT DOCUMENTS

| | | | | |
|---|---|---|---|---|
| 2004/0090983 | A1* | 5/2004 | Gehring | H04J 3/1682 370/458 |
| 2006/0215617 | A1 | 9/2006 | Martin | |
| 2007/0161364 | A1* | 7/2007 | Surineni | H04W 74/04 455/343.4 |
| 2016/0088604 | A1 | 3/2016 | Patel et al. | |
| 2016/0149627 | A1 | 5/2016 | De Gaudenzi et al. | |
| 2017/0070992 | A1* | 3/2017 | Matsuo | H04W 74/004 |
| 2017/0127403 | A1 | 5/2017 | Sapio et al. | |
| 2017/0366328 | A1* | 12/2017 | Seo | H04L 5/0051 |
| 2020/0008216 | A1* | 1/2020 | Iyer | H04W 72/042 |
| 2020/0097788 | A1* | 3/2020 | Pedersen | G06Q 10/0833 |
| 2020/0389879 | A1* | 12/2020 | Zhang | H04W 72/044 |

FOREIGN PATENT DOCUMENTS

| | | |
|---|---|---|
| CN | 104469855 A | 3/2015 |
| EP | 1094636 A1 | 4/2001 |
| JP | 8265836 A1 | 10/1996 |
| KR | 20000051978 A | 8/2000 |
| KR | 20170057275 A | 5/2017 |
| KR | 20180076822 A * | 7/2018 |
| WO | 2000054438 A1 | 9/2000 |
| WO | 2005078646 A1 | 8/2005 |

OTHER PUBLICATIONS

GS1, "EPC TM Radio-Frequency Identity Protocols Generation-2 UHF RFID, Specification for RFID Air Interface, Protocol for Communications at 860 MHz-960 MHz, Version 2.0.0 Ratified", Nov. 2013, Version 2.0 (Year: 2013).*

* cited by examiner

SYSTEM AND METHOD FOR SCHEDULING COMMUNICATION RESOURCES

CROSS-REFERENCE TO RELATED APPLICATION

The present application claims priority to PCT international application PCT/CN2017/095963, entitled "SYSTEM AND METHOD FOR SCHEDULING COMMUNICATION RESOURCES," filed on Aug. 4, 2017, which is expressly incorporated by reference herein in its entirety.

TECHNICAL FIELD

The disclosure relates generally to wireless communications and, more particularly, to systems and methods for scheduling resources.

BACKGROUND

In a burst-type communication network, it is inefficient to dedicate communication channels to individual communication nodes which may only transmit sporadically. In this regard, in many burst-type communication networks, communication nodes share communication resources.

Typically, a burst-type communication node transmits data as a series of data packets (hereinafter "packets"), containing a packet header and a data payload. The packet header is often used by a receiving node to detect and synchronize the receiver to the data transmission. The header also may contain information regarding the data transmission, such as packet length, data format, transmitter ID, receiver ID, etc.

Burst-type communication networks employ a variety of protocols for sharing limited communication resources among multiple communication terminals. One well-known protocol used in communication networks which transmit packetized data is called the "slotted ALOHA" communication protocol.

FIG. 1 illustrates general operation principles of the slotted ALOHA communication protocol. As shown, a communication network using the slotted ALOHA communication protocol divides communication resources 100, which are arranged along a time domain and located at a frequency (or channel/sub-channel) along a frequency domain, into a series of time slots 110. In general, a plurality of such time slots are "bundled" into a plurality of time slot sets or series 120, 122, 124, 126, 128, and 130, each series having a time period (Tperiod). In particular, a time period of each series (Tperiod) is defined by a number (Nslot) of time slots 110 multiplied by a time duration (Tslot) of each time slot. All data transmissions in such a slotted ALOHA communication network must begin at a respective starting time of a repetitive series of time slots (e.g., 120 to 130). In other words, a new packet must wait to be transmitted (by a transmitting node) and/or received (by a receiving/scheduler node) until a start time of a next repetitive series of time slots.

For example when a receiving node and a transmitting node are "connectionless,", i.e., there is no prior communication arrangement between them, and when the repetitive series 124 is used, for example, by the transmitting node for transmitting a first packet, even though a second (e.g., subsequent) packet is ready to be transmitted at time 124-1, the transmitting node must wait until the ending time 124-2 of the repetitive series 124, which is the starting time of the next repetitive series 126, to transmit the second packet. In another example where a receiving node and a transmitting node are "connection-oriented,", i.e., at least some prior communication arrangement has been established, when the receiving/scheduler node allows the series 124 to be used by the transmitting node for transmitting a first packet, even though a second (e.g., subsequent) packet is ready to be transmitted at time 124-1, the receiving/scheduler node won't allow the second packet to be transmitted until time 124-2. As such, in either the connectionless or connection-oriented case, a "waiting time," e.g., a time duration between times 124-1 to 124-2, is present.

In general, the number of time slots (Nslot) for the repetitive series is chosen to be large enough for reliability and coverage concerns, but the above-mentioned waiting time is positively proportional to the number of time slots (Nslot). When the waiting time is accordingly increased as Nslot increases, a variety of issues, e.g., higher collision probability, coarser granularity of communication resources, etc., may arise. Thus, existing systems and methods for scheduling communication resources using the slotted ALOHA protocol are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: determining a plurality of time slot resources contiguously allocated along a time domain, wherein a first subset of the plurality of time slot resources is assigned for receiving a first signal and a second subset of the plurality of time slot resources, contiguously allocated after the first subset of the plurality of time slot resources along the time domain, is assigned for receiving a second signal; and receiving the second signal transmitted in part of the first subset of the plurality of time slot resources.

In a further embodiment, a method includes: sending a first signal using a first subset of a plurality of time slot resources contiguously allocated along a time domain; and sending a second signal using a second subset of the plurality of time slot resources with an updated start time that is before an ending time of the first subset of the plurality of time slot resources.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
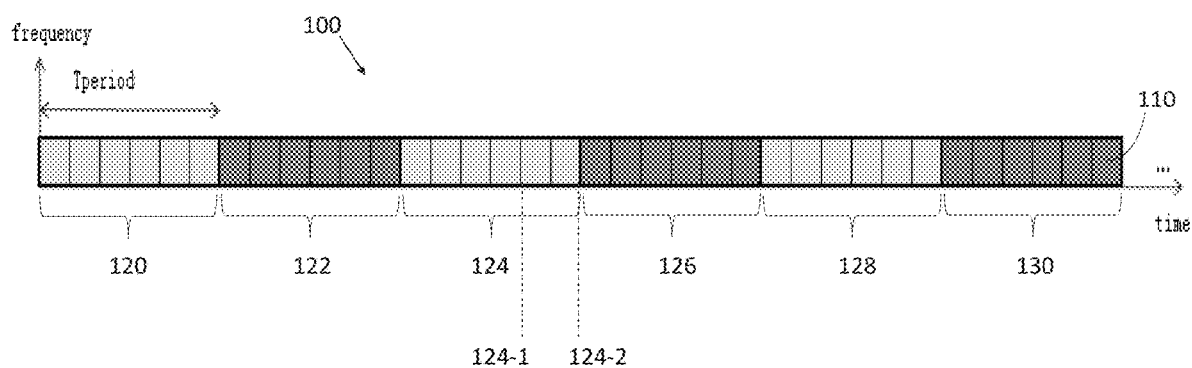
FIG. 1 illustrates operation principles of a slotted ALOHA communication protocol, in accordance with some embodiments of the present disclosure.
Figure 2:
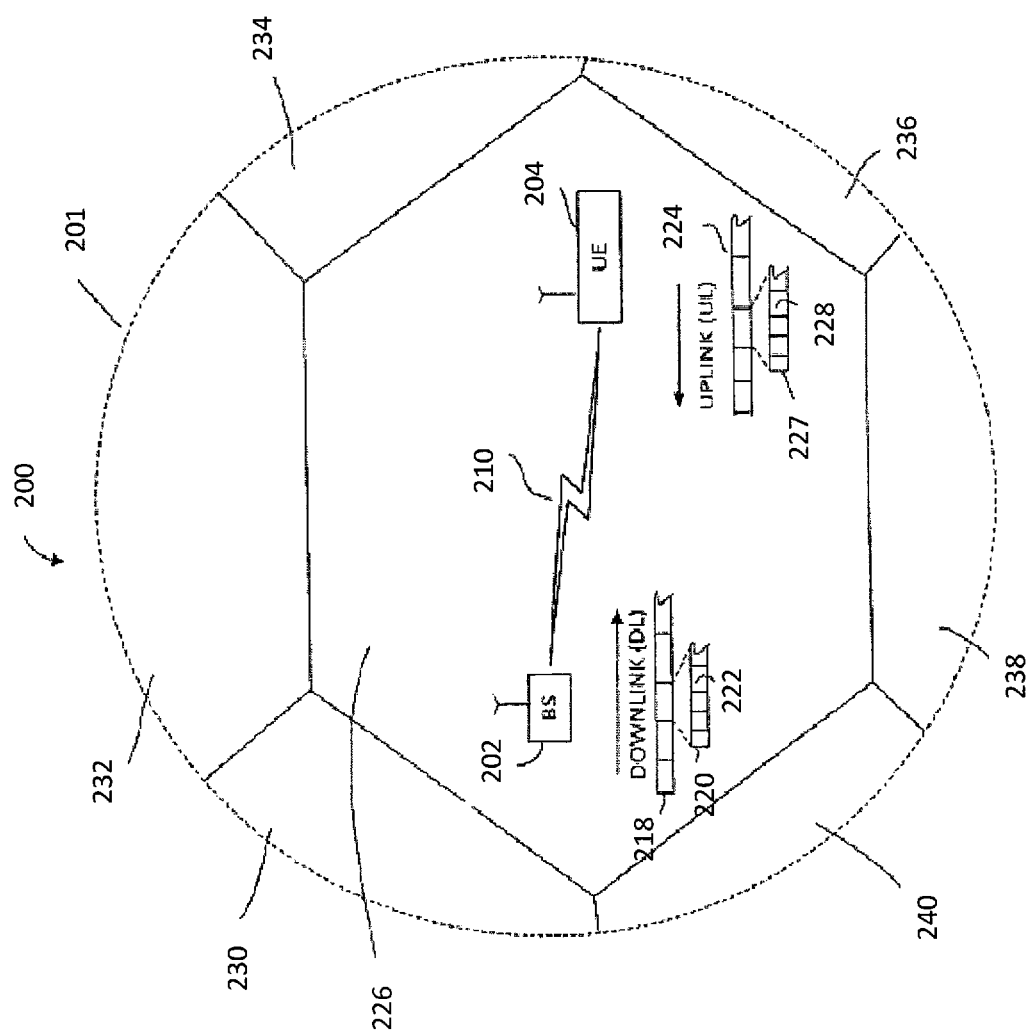
FIG. 2 illustrates an exemplary cellular communication network in which techniques disclosed herein may be implemented, in accordance with some embodiments of the present disclosure.

FIG. 2 illustrates an exemplary wireless communication network 200 in which techniques disclosed herein may be implemented, in accordance with an embodiment of the present disclosure. The exemplary communication network 200 includes a base station 202 (hereinafter "BS 202") and a user equipment device 204 (hereinafter "UE 204") that can communicate with each other via a communication link 210 (e.g., a wireless communication channel), and a cluster of notional cells 226, 230, 232, 234, 236, 238 and 240 overlaying a geographical area 201. In FIG. 2, the BS 202 and UE 204 are contained within the geographic boundary of cell 226. Each of the other cells 230, 232, 234, 236, 238 and 240 may include at least one base station operating at its allocated bandwidth to provide adequate radio coverage to its intended users. For example, the base station 202 may operate at an allocated channel transmission bandwidth to provide adequate coverage to the UE 204. The base station 202 and the UE 204 may communicate via a downlink radio frame 218, and an uplink radio frame 224 respectively. Each radio frame 218/224 may be further divided into sub-frames 220/227 which may include data symbols 222/228. In the present disclosure, the BS 202 and UE 204 are described herein as non-limiting examples of "communication nodes," generally, which can practice the methods disclosed herein. Such communication nodes may be capable of wireless and/or wired communications, in accordance with various embodiments of the invention.

Figure 3:
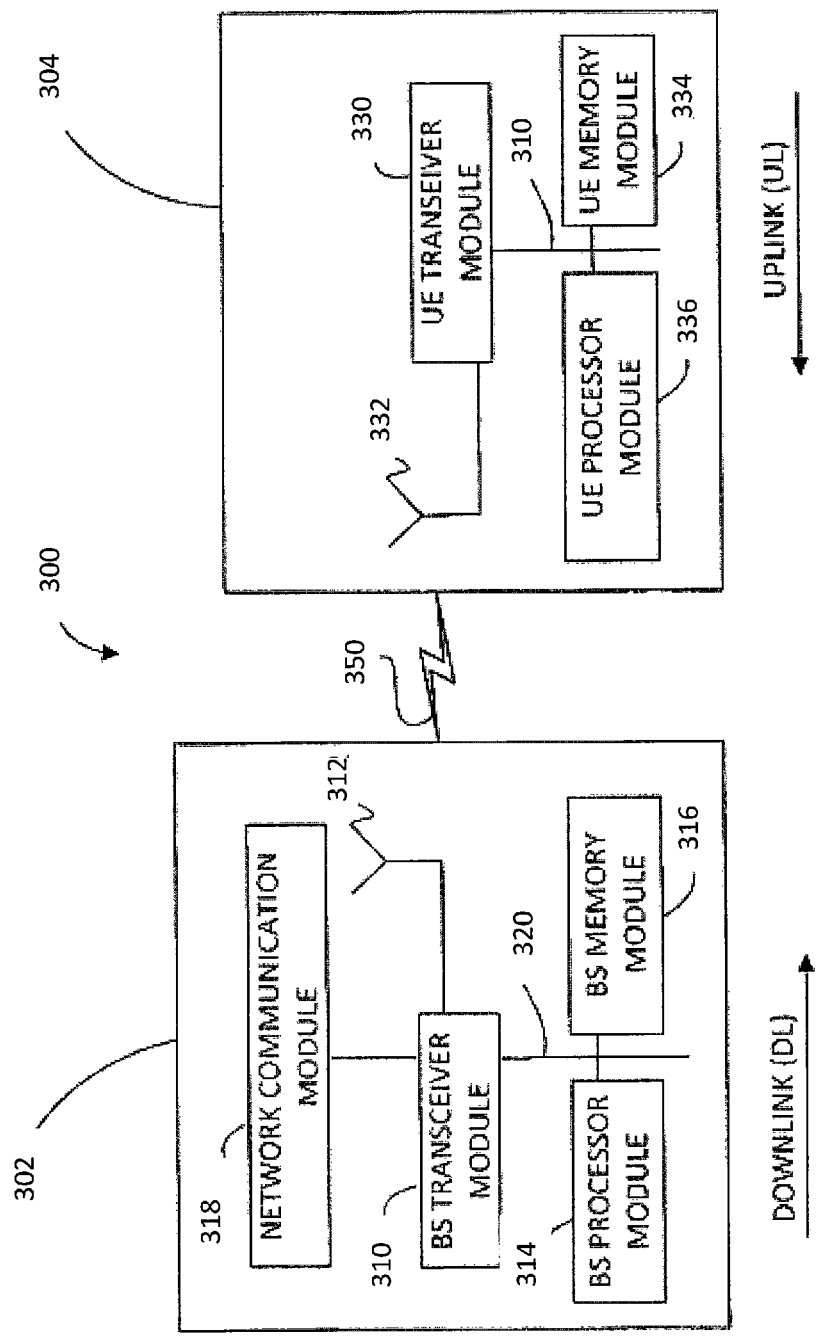
FIG. 3 illustrates block diagrams of an exemplary base station and a user equipment device, in accordance with some embodiments of the present disclosure.

FIG. 3 illustrates a block diagram of an exemplary wireless communication system 300 for transmitting and receiving wireless communication signals, e.g., OFDM/OFDMA signals, in accordance with some embodiments of the invention. The system 300 may include components and elements configured to support known or conventional operating features that need not be described in detail herein. In one exemplary embodiment, the system 300 can be used to transmit and receive data symbols in a wireless communication environment such as the wireless communication environment 200 of FIG. 2, as described above.

System 300 generally includes a base station 302 (hereinafter "BS 302") and a user equipment device 304 (hereinafter "UE 304"). The BS 302 includes a BS (base station) transceiver module 310, a BS antenna 312, a BS processor module 314, a BS memory module 316, and a network communication module 318, each module being coupled and interconnected with one another as necessary via a date communication bus 320. The UE 304 includes a UE (user equipment) transceiver module 330, a UE antenna 332, a UE memory module 334, and a UE processor module 336, each module being coupled and interconnected with one another as necessary via a date communication bus 340. The BS 302 communicates with the UE 304 via a communication channel 350, which can be any wireless channel or other medium known in the art suitable for transmission of data as described herein.

As would be understood by persons of ordinary skill in the art, system 300 may further include any number of modules other than the modules shown in FIG. 3. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 330 may be referred to herein as an "uplink" transceiver 330 that includes a RF transmitter and receiver circuitry that are each coupled to the antenna 332. A duplex switch (not shown) may alternatively couple the uplink transmitter or receiver to the uplink antenna in time duplex fashion. Similarly, in accordance with some embodiments, the BS transceiver 310 may be referred to herein as a "downlink" transceiver 310 that includes RF transmitter and receiver circuitry that are each coupled to the antenna 312. A downlink duplex switch may alternatively couple the downlink transmitter or receiver to the downlink antenna 312 in time duplex fashion. The operations of the two transceivers 310 and 330 are coordinated in time such that the uplink receiver is coupled to the uplink antenna 332 for reception of transmissions over the wireless transmission link 350 at the same time that the downlink transmitter is coupled to the downlink antenna 312. Preferably there is close time synchronization with only a minimal guard time between changes in duplex direction.

The UE transceiver 330 and the BS transceiver 310 are configured to communicate via the wireless data communication link 350, and cooperate with a suitably configured RF antenna arrangement 312/332 that can support a particular wireless communication protocol and modulation scheme.

In some exemplary embodiments, the UE transceiver 330 and the BS transceiver 310 are configured to support industry standards such as the Long Term Evolution (LTE) and emerging 5G standards, and the like. It is understood, however, that the invention is not necessarily limited in application to a particular standard and associated protocols. Rather, the UE transceiver 330 and the BS transceiver 310 may be configured to support alternate, or additional, wireless data communication protocols, including future standards or variations thereof.

In accordance with various embodiments, the BS 302 may be an evolved node B (eNB), a serving eNB, a target eNB, a femto station, or a pico station, for example. In some embodiments, the UE 304 may be embodied in various types of user devices such as a mobile phone, a smart phone, a personal digital assistant (PDA), tablet, laptop computer, wearable computing device, etc. The processor modules 314 and 336 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 314 and 336, respectively, or in any practical combination thereof. The memory modules 316 and 334 may be realized as RAM memory, flash memory, ROM memory, EPROM memory, EEPROM memory, registers, a hard disk, a removable disk, a CD-ROM, or any other form of storage medium known in the art. In this regard, memory modules 316 and 334 may be coupled to the processor modules 310 and 330, respectively, such that the processors modules 310 and 330 can read information from, and write information to, memory modules 316 and 334, respectively. The memory modules 316 and 334 may also be integrated into their respective processor modules 310 and 330. In some embodiments, the memory modules 316 and 334 may each include a cache memory for storing temporary variables or other intermediate information during execution of instructions to be executed by processor modules 310 and 330, respectively. Memory modules 316 and 334 may also each include non-volatile memory for storing instructions to be executed by the processor modules 310 and 330, respectively.

The network communication module 318 generally represents the hardware, software, firmware, processing logic, and/or other components of the base station 302 that enable bi-directional communication between the BS transceiver 310 and other network components and communication nodes configured to communication with the base station 302. For example, network communication module 318 may be configured to support internet or WiMAX traffic. In a typical deployment, without limitation, network communication module 318 provides an 802.3 Ethernet interface such that the BS transceiver 310 can communicate with a conventional Ethernet based computer network. In this manner, the network communication module 318 may include a physical interface for connection to the computer network (e.g., Mobile Switching Center (MSC)). The terms "configured for," "configured to" and conjugations thereof, as used herein with respect to a specified operation or function refers to a device, component, circuit, structure, machine, signal, etc., that is physically constructed, programmed, formatted and/or arranged to perform the specified operation or function.

Referring again to FIG. 2, when the communication network 200 adopts the slotted ALOHA protocol for data transmission (e.g., transmitting/receiving packets) between the BS 202 (e.g., a receiving/scheduler node) and UE 204 (e.g., a transmitting node), a timing for a packet to be subsequently transmitted/received is typically limited by a "time boundary" of a next pre-defined series of time slots, e.g., a starting time of the next pre-defined series of time slots, which may cause various issues, as described above.

The present disclosure provides various embodiments of systems and methods to schedule communication resources, arranged along the time domain, by providing at least one additional starting time to each repetitive series of time slots that is defined by the slotted ALOHA protocol. As such, the communication resources can be better scheduled because in addition to the original starting time of each defined repetitive series at which a packet can be transmitted/received, the packet can also be transmitted/received at the additional starting time of each pre-defined repetitive series. Alternatively stated, in some embodiments, when plural packets are transmitted/received using such a novel slotted ALOHA protocol that includes the additional starting times, the waiting time for each packet to be transmitted/received may be significantly reduced and the above-described trade-off between the waiting time and the number of time slots, observed in conventional slotted ALOHA protocol, may be advantageously avoided.

Figure 4:
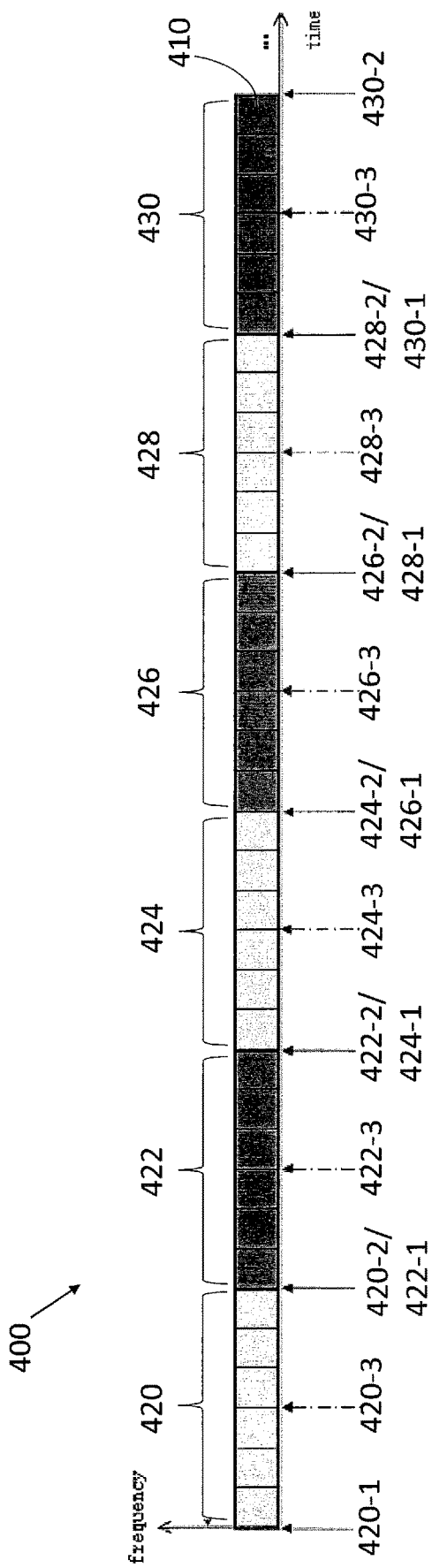
FIG. 4 illustrates operation principles of a novel slotted ALOHA communication protocol, in accordance with some embodiments of the present disclosure.

FIG. 4 illustrates general operation principles of a novel slotted ALOHA communication protocol, in accordance with some embodiments of the invention. As shown, a communication network using the novel slotted ALOHA communication protocol divides communication resources 400, which are arranged along the time domain and located at a frequency (or channel/sub-channel) along the frequency domain, into a series of time slots 410. In some embodiments, each time slot 410 may be used to transmit a packet, and a plurality of adjacent (in time domain) time slots may be bundled into a plurality of repetitive series 420, 422, 424, 426, 428, and 430 to transmit a plurality of packets within each series. More specifically, in some embodiments, each of the time slots in a respective repetitive series (e.g., series 420) may be used to repeatedly transmit a respective packet.

In the illustrated embodiment of FIG. 4, a plurality of repetitive series 420, 422, 424, 426, 428, and 430 are respectively shown. The repetitive series 420 has a respective number of time slots (e.g., 6), and starts at starting time 420-1 and ends at ending time 420-2; the repetitive series 422 has a respective number of time slots (e.g., 6), and starts at starting time 422-1 (also the ending time 420-2) and ends at ending time 422-2; the repetitive series 424 has a respective number of time slots (e.g., 6), and starts at starting time 424-1 (also the ending time 422-2) and ends at ending time 424-2; the repetitive series 426 has a respective number of time slots (e.g., 6), and starts at starting time 426-1 (also the ending time 424-2) and ends at ending time 426-2; the repetitive series 428 has a respective number of time slots (e.g., 6), and starts at starting time 428-1 (also the ending time 426-2) and ends at ending time 428-2; and the repetitive series 430 has a respective number of time slots (e.g., 6), and starts at starting time 430-1 (also the ending time 428-2) and ends at ending time 430-2. Although the respective numbers of time slots in the repetitive series 420 to 430 are the same in the above example, it is understood that each repetitive series may have a respective different number of time slots, i.e., different Nslot.

Further, according to some embodiments of the present disclosure, each repetitive series (420-430) includes at least one additional starting time. For example, the repetitive series 420 includes an additional starting time 420-3; the repetitive series 422 includes an additional starting time 422-3; the series 424 includes an additional starting time 424-3; the repetitive series 426 includes an additional starting time 426-3; the series repetitive 428 includes an additional starting time 428-3; and the repetitive series 430 includes an additional starting time 430-3. A timing of each of the additional starting times 420-3 to 430-3 within the respective repetitive series may be determined, or updated periodically, based on decoding statuses of packets transmitted/received using a previous timing configuration of the communication resources 400, which will be discussed in further detail below. As mentioned above, by providing at least one additional starting time within each of the repetitive series, the above-described waiting time to transmit/receive a next packet may be substantially reduced (because the "allowed" timing for transmitting/receiving the next packet is advanced from a starting time of a next repetitive series to the additional starting time of the current repetitive series) while the number of time slots can remain unchanged.

In some embodiments, when a communication network (e.g., a massive machine type communication (mMTC) network) using the novel slotted ALOHA communication protocol comprises a BS and a plurality of UE's, the BS and the plurality of UE's may communication with each other in a connectionless mode. In other words, the plurality of UE's may share the same communication resources in a purely grant-free manner Such shared communication resources include a plurality of repetitive series as discussed above, each of which has a respective starting time, a time period, and at least one additional starting time. In some embodiments, the BS may periodically broadcast a non-UE-specific configuration signal (e.g., a radio resource control (RRC) signal) indicating (e.g., updating) the timing configuration of such shared communication resources, which includes a timing of the at least one additional starting time within each of the repetitive series. In such an embodiment where the novel slotted ALOHA communication protocol is used in the mMTC network, given a typically large number of the UE's, the timing configuration of the shared communication resources may be periodically updated based on a collective decoding status of all the UE's in the mMTC network, which may take up to hours or days.

Using the communication resources 400 as an example, the series 420 to 430 are shared by the plurality of UE's in the mMTC network. A first UE in the mMTC network may first use the series 420 to transmit a first packet starting at time 420-1, and subsequently, at time 420-3, based on a respective data transmission capability (e.g., whether a data buffer is available), the first UE may use the remaining time slots of the series 420 to transmit a remaining portion of the first packet and a second packet. As such, the first UE does not need to wait until the starting time 422-1 of the next series 422 to transmit the second packet. Since the communication resources 400 are shared by the plurality of UE's in the mMTC network, a second UE in the mMTC network may use time slots identical to or different from the time slots the first UE uses to transmit a respective packet. Similarly, each UE in the mMTC network may have at least one additional time (e.g., 420-3, 422-3, 424-3, 426-3, 428-3, 430-3, etc.) to transmit respective packets.

As mentioned above, the timing configuration of the shared communication resources 400, e.g., where the additional starting times are located along the time domain, may be periodically updated based on a collective decoding status of all the UE's in the mMTC network. In an example, when the timing of each of the additional starting times is located at a middle of each respective series (as shown in the illustrated embodiment of FIG. 4), the BS of the mMTC network may determine a rate of successfully decoding the packets received from the plurality of UE's is too low, and accordingly change the timing locations of the additional starting times. Therefore, the communication resources 400 can be used more efficiently.

In another embodiment, when a communication network (e.g., an ultra-reliable low-latency communication (URLLC) network) using the novel slotted ALOHA communication protocol comprises a BS and a plurality of UE's, the BS and the plurality of UE's may communication with each other in a connection-oriented mode. As such, the BS may divide communication resources into plural time slots and group the time slots into a plurality of "sub-series," each of which is assigned for one or more of the plurality of UE's to transmit packets, that is, one sub-series may be simultaneously used by one or more UE's. In particular, each of the sub-series has a respective starting time and a time period, wherein the starting time may be one of the above-described additional starting times. In some embodiments, the BS may transmit plural UE-specific configuration signals (e.g., radio resource control (RRC) signals) to corresponding UE's indicating such a timing configuration of the communication resources. In other words, each of the UE's may receive respective assigned sub-series before the UEs transmit any packet. In such an embodiment, the timing configuration of the communication resources (e.g., where the starting time of each sub-series is located in the time domain) may be semi-persistently updated based on a respective decoding status of packet(s) transmitted using the current timing configuration of the communication resources.

Continuing using the communication resources 400 as an example, plural sub-series are provided, each of which starts either at starting time 420-1/422-1/424-1/426-1/428-1/430-1 or additional starting time 420-3/422-3/424-3/426-3/428-3/430-3, and has a respective time period (e.g., 3 time slots). And each UE is assigned with one or more such sub-series to transmit respective packets. A first UE in the URLLC network may be assigned with a sub-series that has 3 time slots starting at the starting time 420-1 and another sub-series that has 3 time slots starting at the additional starting time 420-3; and a second UE in the URLLC network may be assigned with a sub-series that has 3 time slots starting at the additional starting time 420-3 and another sub-series that has 3 time slots starting at the starting time 422-1.

Accordingly, the first UE may use the time slots starting at time 420-1 to transmit a first packet, and subsequently, at time 420-3, based on a respective data transmission capability (e.g., whether a data buffer is available), the first UE may determine whether to transmit a remaining portion of the first packet and a second packet using the time slots starting at time 420-3. As such, the first UE does not need to wait until the starting time 422-1 of the next series 422 to transmit its second packet. The second UE may use the time slots starting at time 420-3 to transmit a first packet. As such, the second UE does not need to wait until the starting time 422-1 of the series 422, next to the series 420 being used by the first UE, to transmit its first packet. Further, subsequently, at time 422-1, based on a respective data transmission capability (e.g., whether a data buffer is available), the second UE may determine whether to transmit a remaining portion of the first packet and a second packet using the time slots starting at time 422-1. Thus, each of the UE's in the URLLC network may shorten a respective waiting time to transmit a packet. As such, the communication resources 400 can be used more efficiently.

As mentioned above, the timing configuration of the communication resources 400 may be semi-persistently updated based on a respective decoding status of packet(s) transmitted using the current timing configuration of the communication resources. Continuing with the above example, after the first UE transmits the first packet using the time slots starting at time 420-1, the BS may feedback a signal to the first UE indicative of whether the first packet has been successfully decoded. Such a signal may be fed back from the BS after each of the packets, transmitted from the plurality of UE's in the URLLC network, has been received and then decoded. In some embodiments, the BS may collect plural such signals, fed back to the UE's, over time and determine whether the timing configuration of the communication resources 400 should be updated.

In yet another embodiment, when a communication network (e.g., an enhanced Mobile Broadband (eMBB) network) using the novel slotted ALOHA communication protocol comprises a BS and a plurality of UE's, the BS and the plurality of UE's may communication with each other in a connection-oriented mode. More specifically, the BS assigns each of the UE's respective granted resources (e.g., time slots) for transmitting packets. In such an embodiment, the BS may divide communication resources into plural time slots and group the time slots into a plurality of "series," each of which is assigned for one UE to transmit packets, and in particular, each of the series includes a respective starting time and a time period, and further includes one of the above-described additional starting times. In some embodiments, a timing of the additional starting time may be dynamically determined by the BS based on a decoding status of a current packet. As such, the BS may selectively release a remaining portion of a series that is originally assigned to a first UE, and re-assign the remaining portion to a second UE for transmitting packets, which will be discussed in further detail below. In some embodiments, the BS may transmit downlink control signals (e.g., physical downlink control channel (PDCCH) signals) to corresponding UE's indicating such a timing configuration of the communication resources. In other words, before each of the UE's transmits any packet, the UE may receive a respective downlink control signal indicating a remaining portion of a series originally assigned to another UE even though, in some embodiments, such another UE may continue using the remaining portion of the series originally assigned to it until the ending time of the series.

Continuing using the communication resources 400 as an example, each UE is originally assigned with at least one series (420, 422, 424, 426, 428, 430) to transmit respective packets, wherein each series includes a respective starting time (e.g., 420-1, 422-1, 424-1, 426-1, 428-1, 430-1) and a time period (e.g., 6 time slots), and further includes at least one additional starting time (e.g., e.g., 420-3, 422-3, 424-3, 426-3, 428-3, 430-3).

For example, a first UE in the eMBB network may be originally assigned with the series 420; and a second UE in the eMBB network may be originally assigned with series 422. In some embodiments, the first UE may use the time slots starting at time 420-1 to transmit a first packet, and subsequently, the BS receives and successfully decodes the first packet by checking consistency of the cyclic redundancy check (CRC) code of the first packet. Also, the BS determines that the series 420 that is originally assigned to the first UE has only been used partially, e.g., 4 time slots, while the first packet has been successfully decoded. Consequently, the BS releases the remaining time slots (e.g., 2 time slots) of the series 420, and re-assign these remaining time slots to a second UE for transmitting respective packets. In other words, the BS determines a timing of an additional starting time in the series 420 at 4 time slots after the starting time 420-1. As such, the second UE does not need to wait until the starting time 422-1 of the series 422 to transmit packets. Thus, the communication resources 400 can be used more efficiently.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   determining a plurality of time slot resources contiguously allocated along a time domain, wherein a first subset of the plurality of time slot resources is assigned for receiving a first signal and a second subset of the plurality of time slot resources, contiguously allocated after the first subset of the plurality of time slot resources along the time domain, is assigned for receiving a second signal;
   determining, based on a status of decoding the first signal, an updated start time of the second subset of the plurality of time slot resources, wherein the updated start time is before an ending time of the first subset of the plurality of time slot resources; and
   receiving the second signal starting from the updated start time of the second subset of the plurality of time slot resources.

2. The method of claim 1, wherein the plurality of time slot resources are contiguously allocated along the time domain based on a slotted ALOHA protocol.

3. The method of claim 1, wherein the updated start time of the second subset of the plurality of time slot resources is periodically updated based on a rate of successfully decoding packets from a plurality of communication nodes.

4. The method of claim 3, further comprises:
   broadcasting a non-user equipment-specific configuration signal, indicative of the updated start time of the second subset of the plurality of time slot resources, to a plurality of connectionless communication nodes.

5. The method of claim 3, further comprises:
   transmitting a user equipment-specific configuration signal, indicative of the updated start time of the second subset of the plurality of time slot resources, to a first connection-oriented communication node.

6. The method of claim 3, further comprises:
   transmitting a control signal, indicative of the updated start time of the second subset of the plurality of time slot resources, to a second connection-oriented communication node.

7. A method, comprising:
   sending a first signal using a first subset of a plurality of time slot resources contiguously allocated along a time domain; and
   sending a second signal using a second subset of the plurality of time slot resources with an updated start time that is before an ending time of the first subset of the plurality of time slot resources, wherein the updated start time is determined based on a status of decoding the first signal.

8. The method of claim 7, wherein the plurality of time slot resources are contiguously allocated along the time domain based on a slotted ALOHA protocol.

9. The method of claim 7, further comprises:
   before sending the second signal, receiving a non-user equipment-specific configuration signal, indicative of the updated start time of the second subset of the plurality of time slot resources.

10. The method of claim 7, further comprises:
before sending the second signal, receiving a user equipment-specific configuration signal, indicative of the updated start time of the second subset of the plurality of time slot resources.

11. The method of claim 7, further comprises:
receiving a control signal indicative of the updated start time of the second subset of the plurality of time slot resources, wherein the control signal corresponds to the status of decoding the first signal.

12. A non-transitory computer-readable medium having stored thereon computer-executable instructions that when executed carry out a method, the method comprising:
determining a plurality of time slot resources contiguously allocated along a time domain, wherein a first subset of the plurality of time slot resources is assigned for receiving a first signal and a second subset of the plurality of time slot resources, contiguously allocated after the first subset of the plurality of time slot resources along the time domain, is assigned for receiving a second signal;
determining, based on a status of decoding the first signal, an updated start time of the second subset of the plurality of time slot resources, wherein the updated start time is before an ending time of the first subset of the plurality of time slot resources; and
receiving the second signal starting from the updated start time of the second subset of the plurality of time slot resources.

13. The non-transitory computer-readable medium of claim 12, wherein the plurality of time slot resources are contiguously allocated along the time domain based on a slotted ALOHA protocol.

14. The non-transitory computer-readable medium of claim 12, wherein the updated start time of the second subset of the plurality of time slot resources is periodically updated based on a rate of successfully decoding packets from a plurality of communication nodes.

15. The non-transitory computer-readable medium of claim 14, wherein the method comprises:
broadcasting a non-user equipment-specific configuration signal, indicative of the updated start time of the second subset of the plurality of time slot resources, to a plurality of connectionless communication nodes.

16. The non-transitory computer-readable medium of claim 14, wherein the method further comprises:
transmitting a user equipment-specific configuration signal, indicative of the updated start time of the second subset of the plurality of time slot resources, to a first connection-oriented communication node.

17. The non-transitory computer-readable medium of claim 14, wherein the method further comprises:
transmitting a control signal, indicative of the updated start time of the second subset of the plurality of time slot resources, to a second connection-oriented communication node.

* * * * *